April 28, 1925.
O. H. ENSIGN
1,535,657
METHOD OF AND MEANS FOR PRODUCING POWER FROM FUEL
Filed May 8, 1917
4 Sheets-Sheet 1
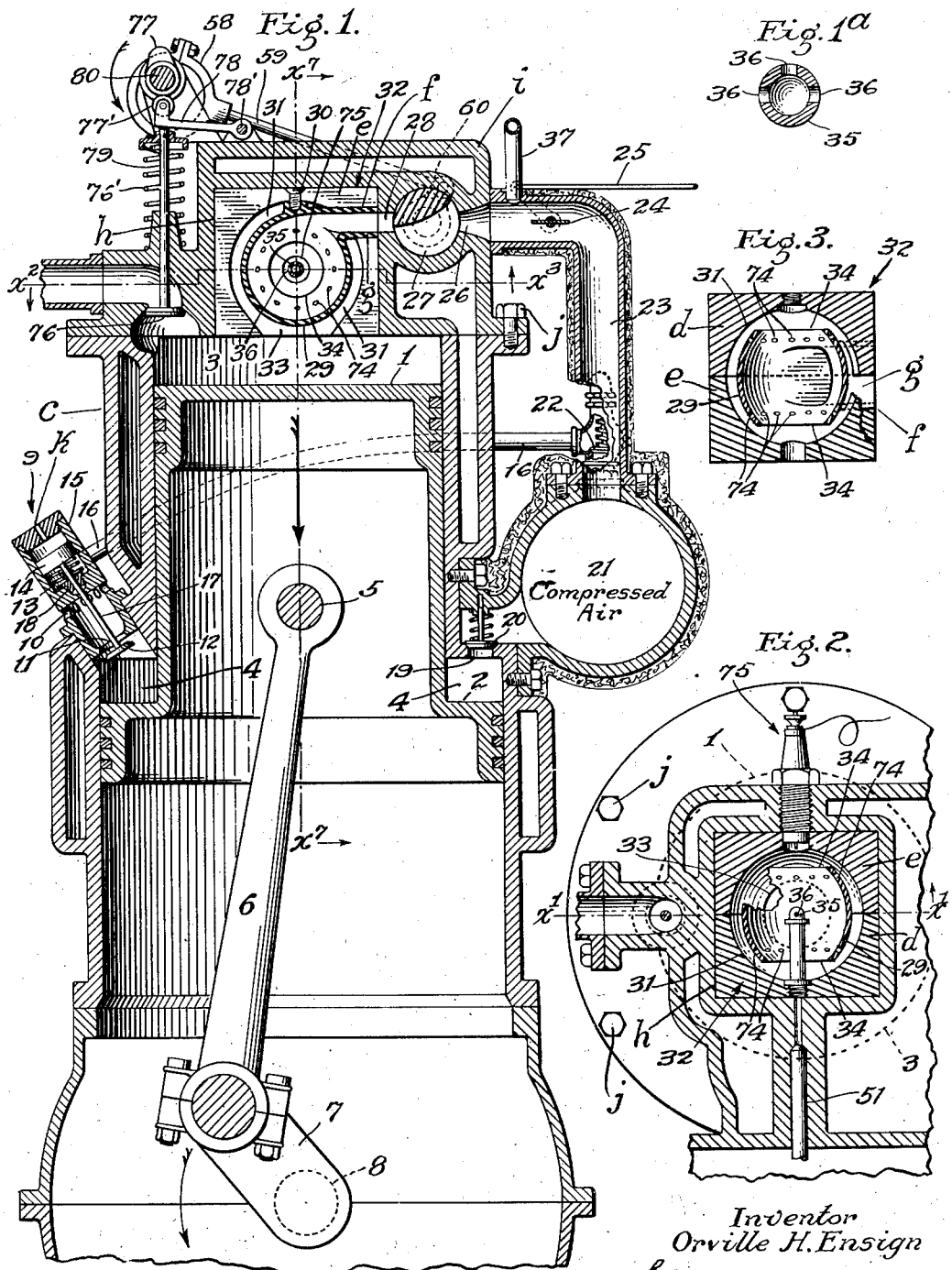
Inventor
Orville H. Ensign

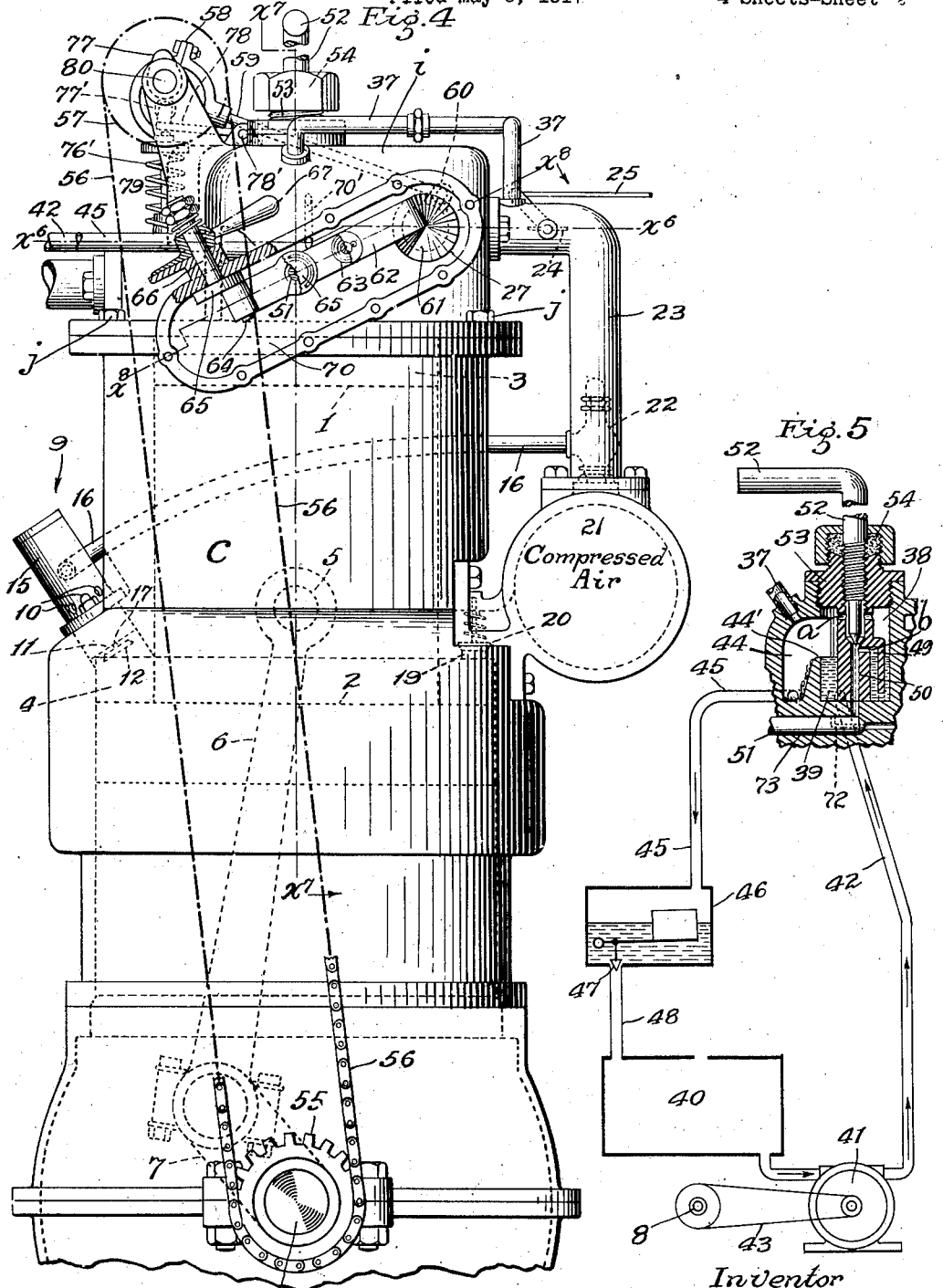

April 28, 1925.
O. H. ENSIGN
METHOD OF AND MEANS FOR PRODUCING POWER FROM FUEL
Filed May 8, 1917
1,535,657
4 Sheets-Sheet 3
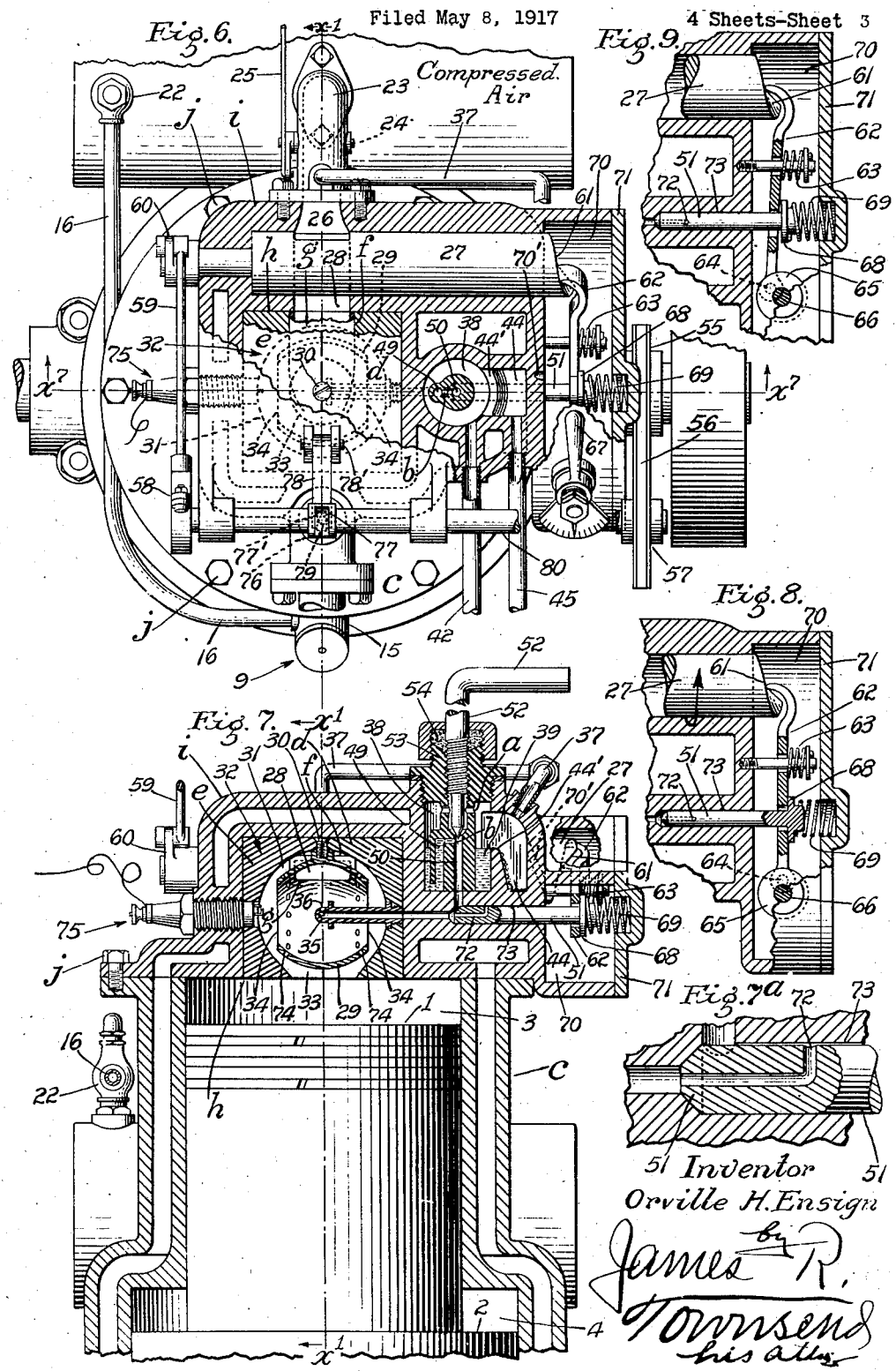
Inventor
Orville H. Ensign
by James R. Townsend
his atty.

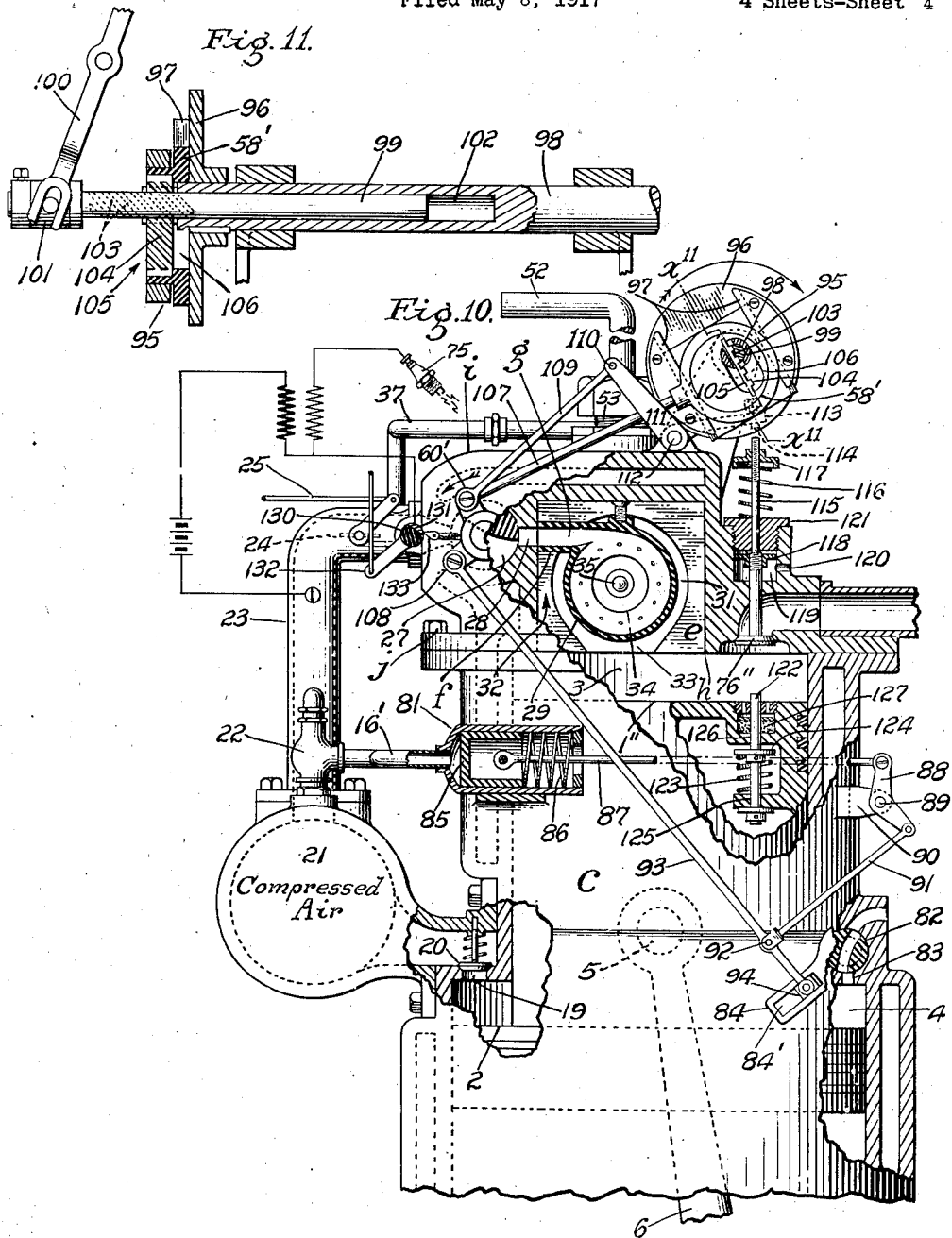

Patented Apr. 28, 1925.

1,535,657

UNITED STATES PATENT OFFICE.

ORVILLE H. ENSIGN, OF PASADENA, CALIFORNIA.

METHOD OF AND MEANS FOR PRODUCING POWER FROM FUEL.

Application filed May 8, 1917. Serial No. 167,347.

*To all whom it may concern:*

Be it known that I, ORVILLE HIRAM ENSIGN, a citizen of the United States, residing at 903 Oakland Avenue, in the city of Pasadena, county of Los Angeles, and State of California, have discovered and invented a new and useful Method of and Means for Producing Power from Fuel, of which the following is a specification.

This invention relates to internal combustion engines of the constant pressure cycle commonly known as the Brayton cycle in which it is proposed to burn fuel under pressure of flowing air, non-explosively, for the purpose of generating power.

In engines of this type heretofore constructed a difficulty has been encountered in that there is such a liability to back fire as to make the engine impracticable for any long service.

I have discovered that by introducing the fuel and the air into the combustion chamber separately, properly timed, and under co-ordinated pressures from air stored in an air receiver and maintaining the admitted fuel during the admission periods in proper proportion to the air supplied, and causing combustion to occur during such periods, the difficulties heretofore encountered in this respect are entirely overcome, and a practical internal combustion engine of the constant pressure type can be constructed.

The discovery and invention may be carried out in various ways and is practical in horizontal or vertical types of reciprocating engines, single or multi-cylinder, and in gas turbine engines and the like.

I have discovered that it is possible to effect complete combustion of a flaming mixture of fuel and compressed air without explosion within a small compass, thus adding heat energy to the potential energy of the compressed air, and that the resultant may be immediately applied to a power translating device or prime mover such as a reciprocating piston or a turbine.

I regard this invention as an improvement in the art in that I am the first to produce power of a constant pressure character to operate an engine directly from internal combustion by establishing an air current of high velocity, introducing liquid fuel to said air current in co-ordinate proportions determined by such velocity and thoroughly mixing the same, and immediately igniting the mixture and applying it to work.

Said invention is also an improvement in the art in utilizing vortical action produced by a current of compressed air as a proportioning and mixing means for supplying a burning mixture to the main combustion zone.

I have discovered that by the admission of fuel to the center of a vortex of rapidly revolving air under pressure, and igniting the fuel immediately upon its entrance to the center of this vortex of air, that translation and combustion of the fuel progresses outwardly as the air whirls inwardly, and is accelerated and augmented by the violent disruption and agitation produced within the outwardly whirling flame, thus bringing fresh oxygen to the vapors and gases in their nascent state as they are produced from the fuel thrown out by centrifugal force from the center of the vortex from which the vapors originated, thus insuring absolutely complete combustion in an exceedingly small space from which the products of such combustion may be applied to the cylinder of an engine without danger that the cooler walls of said cylinder may condense the vapors or gases.

The invention is an improvement in the art in that I apply to the fuel supply a pressure corresponding to the pressure of the compressed air and set up a vortical action in the compressed air around the point of fuel introduction and ignition, so that I utilize the loss of pressure or the pressure drop at the vortex as a proportioning and weighing factor to establish and meter the fuel flow, thus to certainly determine the proportionate amount of fuel introduced into the air current.

A feature of the invention in its approved form is the application directly to an engine cylinder of a carbureting burner so constructed, arranged and supplied as to automatically and constantly produce a properly proportioned mixture of fuel and air during the period of admission of said air and fuel; and the resulting mixture may be adjusted from that which will consume all the oxygen of the air and thus give maximum heat development, down to a mixture which will only consume a fraction of the oxygen of the air, thus to give a wide temperature and power control; but it is understood that for any period of action, the burner will automatically hold any adjusted mixture constant during that period irrespective of the duration of the period or the variation in velocity of air flowing during said period.

A feature of this invention resides in the application of a common air pressure on the fuel supply and the air supply, and utilizing vortical action at the place of mixing to generate high velocity and an effective mixing action of the air current, and to weigh and proportion the fuel and air introduced to the mixing and combustion locus.

The invention also relates to the means which I have devised for carrying out the principles of my discovery.

A feature of economy and of superior action in carrying out this invention is the direct delivery of highly compressed air to a combined mixing and combustion zone so that the heat of compression is conserved for facilitating combustion and is delivered to the mixing zone where it will be of greatest effect.

An object of the invention is to provide means for maintaining a flame under pressure and to directly apply the product thereof within the cylinder of an internal combustion engine without danger of extinguishment under widely varying mixtures of fuel and air, separately introduced, and under widely varying velocities of entrance of said fuel and air into the cylinder.

Another object of the invention is to bring about a solution of the problem of providing a light and compact form of the constant pressure type of internal combustion engine. This I do by compressing the air alone in a separate compressing chamber and preferably by an annular extension or shoulder on the power piston, applying the pressure of said air to operate a carburetor device, which by the velocity of entering air proportions the fuel and air and brings them together in a flame inside the carbureter whence the resulting products are applied to the piston in a cylinder at the beginning of the power stroke.

Another object of the invention is to control timing and acceleration of the delivery of the fuel to the mixing chamber inside the cylinder with reference to the admission of the compressed air.

In this invention practically perfect combustion is accomplished by arranging a carbureting mixing chamber as a whirlpool or vortex chamber, delivering the fuel to the low pressure zone in the center thereof, and igniting the whirling mass of fuel and air, by applying a spark along the axis of the vortex.

The velocity of rotating fuel elements progresses outwardly from zero at the vortical axis, and therefore the heavier constituents predominate near the outer confines of the whirling mass and the lighter volatile elements of the fuels which will mix easily with the air and will ignite easily, tend to remain near such axis where ignition is initiated.

Therefore by locating the igniting means at the axis of the vortex chamber, ignition of low grade fuels is readily accomplished and after the flame is thus started centrally, combustion will progress outward, increasing in intensity as it nears the inflowing air at the periphery of the vortex chamber; and consequently, a cyclonic combustion zone is readily established; and by properly proportioning the fuel to the air, any desirable intensity of flame may be produced, and since the initial flame is at the center, or the point of minimum velocity of the cyclonic combustion zone, great changes in the velocity of the inflowing air at the periphery of such zone will have no tendency to blow out such central flame, and the central flame will continually supply vaporizing and igniting heat inside a zone surrounded by the freshly-supplied air which is flowing at high disrupting velocity. The combusting fuel thus progresses outwardly and axially, whirling at a high rate of speed and is thereby disrupted, so that the flow of nascent gases emanating from the central supply of fuel are violently disrupted with and by means of the freshly supplied air and hence perfect combustion is obtained within a small space of the flowing fuel and air.

An object of the invention is to provide an engine of the internal combustion type that will operate in the simplest and most flexible manner, and that having once been started and thus being supplied with a charge of compressed air in an air receiver, all starting thereafter may be accomplished by the use of compressed air from such receiver, so that the engine is similar to a steam engine for all operations; starting under pressure, meeting variable load, changing speed, running at low speed, and reversing.

By this discovery and invention the power stored in the compressed air plus the energy of the added fuel, is available during the working stroke; thus keeping the engine always at approximately the same temperature; and by regulating the mixture and varying the admission of the fuel, any desired temperature may be maintained for the power stroke.

The attainment of high economy by an early cut-off suitable to the load with its corresponding low terminal pressures is also made possible.

The internal combustion engine as now used throughout the world is what is known as the constant volume type of engine in which combustion takes place with the piston at rest. This necessitates a combustion chamber of considerable volume as an addition to the chamber in the cylinder behind the piston at the close of the working stroke. Hence, regardless of load, the amount of fuel necessary to fill the added chamber is largely lost so that while an engine of the constant volume type is at maximum efficiency at full load and such efficiency may be from 20 to 25% for the best type now in general use, the efficiency of such engines at light loads especially for the average load of automomile engines is probably not more than 10% of such maximum efficiency, that is to say, the efficiency at light loads is probably not more than 2½ to 3%. For this constant pressure type of engine herein disclosed the efficiency is probably the highest at about 25% of the maximum load and the variation of efficiency from minimum to maximum load is comparatively small.

In automobile practice the load during a very great proportion of the time of operation is about 25% of the maximum load required of the engine, and therefore this invention is especially adapted for high economy in automobile practice.

A further object of this invention is to construct an engine of the constant pressure type that will require but one valve operating means for controlling admission valve, exhaust valve and intake air valve to air compressor, both for variable cut-off of the admission valve to the working cylinder to meet conditions of load with high economy, and variable cut-off of intake valve to compressor cylinder, to limit the compressed air to the amount which is necessary to meet the load, and for reversing all the valves with reference to direction of engine rotation. This is accomplished by the use of either a link motion or a shifting eccentric, and for the purpose of easy illustration a shifting eccentric will be shown in the drawings.

This device varies the cut-off of the admission stroke without varying the admission point to any detrimental degree as well as furnishing a means for reversing the engine. This is connected to a rocking type of admission valve which may be provided with a trip not shown herein, similar to a Corliss valve. The same movement is transmitted to an exhaust valve and also to the air compressor intake valve.

This constant pressure type of engine constructed to carry its expected normal load at one-fourth cut-off would give therefore the highest possible efficiency to be had with the normal load, and yet would hold a reserve power of three or more times that amount of energy, and at this full load it is possible for the engine to still have an efficiency equal to or greater than that of the constant volume type of engine. Further- more this extra power can be called upon for all the work now devolving upon the shifting gears in the ordinary automobile.

An object of the invention is to make provision whereby the exhaust of the engine will be exactly timed with relation to the movement of the piston and of the admission valve, irrespective of the direction of rotation of the crank shaft of the engine and the period of the cut-off of the admission valve.

In this invention a current of fresh air supply is applied tangentially outside the whirling combusting mass, and flows toward the axis of such mass. This insulates the surrounding walls, which are annular so that the products of combustion escape axially from the vortex from whence they are applied to the work.

The operation of this invention in its more elaborate reversing and variable cut-off form will be set forth more fully herein after a detail description of the invention has been given.

The invention includes not only the novel method herein set forth but also the engine in every feature of its construction and the various novel parts and combinations of parts hereinafter set forth.

Further objects, advantages and features of invention may appear from the accompanying drawings, the subjoined detail description and the appended claims.

The accompanying drawings illustrate the invention.

Figure 1 is a fragmental axial sectional elevation, on line $x^1$, Figs. 2, 6 and 7, of an engine of simple type constructed in accordance with the main principles of this invention.

Fig. 1$^a$ is an enlargement of the cross section of the fuel nozzle tip shown in Fig. 1.

Fig. 2 is a fragmental plan section on line $x^2$—$x^3$, Fig. 1, looking down. A portion of the vortex mixing chamber is broken away to expose a part of one of the flame ports of the vortical mixing and combustion chambers.

Fig. 3 is a section of the burner alone on said line $x^2$—$x^3$, looking up. A portion of the burner shell is broken away to expose the inlet air passage.

Fig. 4 is a broken elevation of the engine shown in Figs. 1–9, a part of the fuel-timing adjustment being shown in section, and the cover of its box removed.

Fig. 5 is in part a fragmental section of a constant level chamber, timing valve, and fuel adjustment, with a diagrammatic representation of a fuel circulating system connected thereto.

Fig. 6 is a broken plan view in section on different planes mainly indicated by line $x^6$, Fig. 4, to illustrate the construction of the admission valve and the connection therewith of the fuel-timing means.

Fig. 7 is a broken sectional elevation on line $x^7$, Figs. 1, 4 and 6.

Fig. 7$^a$ is an enlarged fragmental sectional view illustrating the fuel valve structure.

Fig. 8 is a view partly in section through the valve timing gear on an irregular line extending in part along the axis of the contact lever as indicated by line $x^8$, Fig. 4.

Fig. 9 is a view analogous to Fig. 8 showing the parts adjusted for different timing.

Fig. 10 is an elevation of a variable cut-off reversing engine constructed in accordance with this invention. Parts are broken away and shown in section to expose interior construction.

Fig. 11 is a fragmental sectional detail on line $x^{11}$, Fig. 10, of means for shifting the eccentric shown in Fig. 10.

In Fig. 10 the electrical ignition circuit is shown diagrammatically.

Referring to the form shown in Figs. 1–9 which is a nonreversible simple engine of the combined power and air compressing reciprocating piston and cylinder type, the prime mover is a well known form of double diameter trunk piston having a central head 1 and an annular head 2 of common construction and operates in the cylinder having the power chamber 3 and the compression chamber 4. Said piston is connected in the usual way by means of the wrist pin 5 and connecting rod 6 to crank 7 of the crank shaft 8.

The air inlet into the air-compressing chamber 4 is provided by means of an intake valve cage 9 having inlets 10 communicating with port 11 normally closed by valve 12 which is normally closed by the valve spring 13 acting on the unloading piston 14 that operates in the cylinder 15 which receives air pressure through pipe 16; the air valve inlet 12 being connected with said piston 14 by valve stem 17 passing through stuffing-box 18.

Air is taken in through the air inlet valve on the power stroke of the piston. The compressed air outlet 19 from the air compressing chamber 4 is controlled by a check valve 20 and communicates with the compressed air receiver 21 which is connected with the pipe 16 through a relief valve 22 and is also connected with the compressed air delivery pipe 23 that is controlled by throttle 24 operated by the rod 25. The compressed air pipe 23 supplies compressed air to the port 26 of the admission valve 27 which controls the admission of compressed air to the inlet 28 of the vortex chamber 29 that is supported by the screw 30 inside the spherical combustion chamber 31 of the burner shell 32 which opens at one side through the flame port 33 into the power chamber 3. The vortex chamber 29 and spherical chamber 31 constitute the main boundary of the combustion zone which opens directly to the power chamber 3 that, in the instance shown, is the piston displacement of an engine cylinder. Said vortex chamber is preferably supported with its axis at right angles to the axes of the flame port and the cylinder.

Said vortex chamber is provided at its ends with axial outlets 34 through which the main body of the more or less ignited fuel mixture flows in opposite directions.

Fuel is introduced into the center of the vortex chamber through a nozzle 35 having jet outlets 36, preferably three in number above the bottom of the fuel nozzle 35, so that when liquid fuel is not being drawn out of the nozzle it will not drip and a supply of fuel will be retained to flow instantly on the next stroke, and will also supply vapor for a pilot light between firing periods when the electric spark is shut off.

The pressure equalizing air pipe 37 is connected to the compressed air pipe 23 between the throttle 24 and the valve port 26 and supplies compressed air to the constant level fuel chamber 38 to which the charge 39 of liquid fuel is supplied from fuel reservoir 40 by pump 41 through supply pipe 42.

Pump 41 is connected by sprocket chain 43 to supply an excess of fuel to the fuel cup 44 and the surplus overflows through return pipe 45 to the surplus reservoir 46, the level of liquid therein being controlled by a float valve 47 which returns the excess fuel through pipe 48 to the supply reservoir 40.

The fuel from the fuel chamber 38 is supplied at the beginning of the power stroke, to the nozzle 35 through a passage 49 that extends above the level of the cup rim 44' and delivers fuel to the downwardly extending fuel duct 50 and past the automatically opened fuel valve 51 to the nozzle 35. Any suction due to the vortex and exerted on the nozzle outlet 36 will operate to cause the liquid fuel to rise in the passage 49 and flow down through the duct 50 and past the open fuel valve 51, thus to reach the nozzle leading to the confined space within the burner shell 32. The openings of the valves 27 and 51 constitute the points of admission of oil and fuel to said confined space.

The flow of fuel under such suction is regulated by admission of air from the fuel chamber 38 to the duct 50 through air ports $a$ and an adjusting valve 52, which is threaded into the adjusting head 53 and packed against leakage of compressed air by stuffing box 54. The orifice $b$ from the fuel passage 49 is large enough to allow an excess of liquid fuel to pass therethrough and the amount which in operation is allowed to pass through is determined by adjustment of the adjusting valve 52. By closing the adjusting valve 52, suction from the vortex chamber by way of fuel nozzle 35 is all exerted upon the fuel. By opening valve 52 the suction is weakened.

Air passing through the passages 28 into the vortex chamber 29 produces a vortex with lowering of air pressure at the axis of said vortex chamber, and as the air pressure in the fuel chamber 38 is equalized with the air pressure supplying the air flowing through the passage 28, the pressure upon the fuel in the fuel cup 44 through the fuel passage 49 with the air valve 52 closed equals that produced by the partial vacuum in the vortex mixing chamber. To adjust the quantity of fuel, adjusting valve 52 may be opened, thus allowing air to flow down through the vertical duct 50, thereby to reduce the difference of pressure across the orifice b.

The flow of air to the tangential air inlet 28 is controlled by the operation of the engine through sprocket gearing 55, 56, 57, eccentric 58 and eccentric rod 59 connected to crank 60 of valve 27. The fuel valve 51 is operated through the medium of the helical cam 61 formed on the end of valve 27 and contact lever 62 held in contact with said cam by the spring 63. Said lever is supported at its end by a fulcrum pin 64 mounted in the disk 65, which is fixed to and movable around its center by the post 66 controlled by lever 67. Said contact lever is adapted to engage the head 68 of the fuel valve 51 for opening said valve, said valve being normally closed by a spring 69. This valve controlling gear is enclosed in a recess 70 formed in the cylinder head and closed against an escape of air pressure by the cover 71 which arrangement avoids stuffing boxes on the air and fuel valves and their operating mechanisms. Fuel valve 51 is provided with a minute duct 72 at its inner end, said duct opening into the valve guide clearance 73. This duct provides with the small clearance between the valve and the valve guide, a slight air leak by way of the valve 52 of the vertical duct 50, and the burner nozzle 35, to the center of the vortex chamber 29.

This leak supplies air to vapor or gas produced from the fuel remaining in the duct 50 and in the fuel passage leading to the burner outlet 36 during the expansion and exhaust stroke, and thus sustains a pilot flame that forms the means of ignition of the next power charge of fuel and air. The slanting air passage 70' communicates between recess 70 and the fuel chamber 38 to equalize the air pressures.

Perforations 74 in the end walls of the vortex mixing chamber near the main outlet allow the production of a greater atomization of the heavier bodies or vapors of the fuel which issue with air through these perforations at a considerable velocity due to the difference of pressure because of their being farther from the center than the main opening 34.

The spark plug 75 supplied by current from any usual means, not shown, supplies initial ignition in the vortex chamber and may be continued in operation if desired although in actual practice an ignition flame is sustained continuously at the fuel nozzle 35 as above stated. The location of the nozzle at the center of the vortex where the velocities are at a minimum makes this operation dependable.

The air and ignited fuel thus produce a vortical combustion zone wherein combustion is maintained while the air entering the vortex chamber 29 through the tangential inlet 28, whirls around within the cavity and envelopes the combustion zone equatorially with whirling air that fills the periphery of the chamber midway between the chamber ends and in turn is surrounded by and receives heat from the hot products flowing from the opposite ends of the combustion zone, and is thereby heated before reaching the fuel at the center of such zone. The fuel is thus supplied with heated air and the walls of the vortex chamber are protected from becoming overheated.

The handle 67 furnishes means for manual control of the timing of the admission of the fuel with reference to the admission of air to the vortex mixing chamber. By the movement of this lever the fulcrum 64 is oscillated so as to change the position of the lever 62 with reference to the position of the head 68 of the valve 51 when said valve is seated, thereby causing the lever 62 to engage the head 68 of the valve 51 earlier or later in the rotating movement of the rocking valve 27 with reference to the point of opening of said rocking valve, and thereby cause the fuel valve 51 to open ahead of the valve 27 or to be retarded, so that it opens later than valve 27. The purpose of opening valve 51 slightly ahead of valve 27 is to provide means to compensate for the greater distance the fuel has to travel in reaching the center of the vortex mixing chamber than the air has to travel in reaching the same point; and to compensate for the greater viscosity and the resultant slow movement of the fuel as compared to that of the air.

Should valve 51 open ahead of valve 27 the pressure in the power chamber 3 would be equal or near to that of the atmosphere, while the pressure upon the surface of the liquid in the cup 44 would be equal to the air pressure in the air receiver 21; therefore, it is made possible to use this difference of pressure to accelerate the movement of the fuel toward the burner outlet 36, so that it will arrive at such outlet at the same instant with the air from the valve 27.

This fulcrum timing means is further made use of under light loads in the following manner: When the engine is operating at loads representing a small fraction of its maximum output the cut-off of the air and fuel supplied to chamber 3 occurs so early in the stroke, or the throttle 24 will be closed so far, that the pressure in the power chamber or cylinder 3 will fall below atmospheric pressure at the end of the stroke. This is liable to represent a loss of power even if the exhaust valve opens against but slight resistance; and it is an advantage to delay the admission of fuel slightly so as to make it necessary to take in more air, thus causing the air to be heated up to a smaller degree than at heavier loads, and sustaining the terminal pressure at about that of the prevailing atmospheric pressure. This may be done by moving the handle 67 in the opposite direction from the one which gives advance acceleration of the liquid fuel, as shown in Fig. 9, and this retards the admission of fuel for the purpose mentioned.

The exhaust valve 76 closed by the spring 76' opens inwardly by the action of the cam 77 operating on the roller 77' journaled in the contact lever 78 which is fulcrumed to the cylinder head by a pin 78' and rests on the top of the valve stem 79.

The cam 77 is operated through the medium of a lay shaft 80 driven by the valve gearing 55, 56, 57.

The air intake valve 12, to the compressor, is fitted with the piston 14 operated in the cylinder 15 for the purpose of controlling the maximum pressure to which the compressor will furnish air, and operates as follows: The relief valve 22 will be so set that it will open when the pressure in the air receiver 21 reaches the desired limit, and the escape through the relief will apply, underneath the piston 14, air pressure which will close the valve. Immediately upon the air in the pipe 16 and under the piston 14 reaching a pressure which will equalize the action on both sides of the relief valve 22 such valve will close responsive to its own spring pressure and the valve 12 will remain closed until such time as the air pressure under the piston 14 has been reduced by leakage past the piston clearance within the cylinder 15 at which time the valve will begin to operate again in a normal manner. This operation is similar to that of the usual unloading devices on air compressors.

The valve 12 may thus remain closed for the period of a number of strokes of the piston and during this period the atmospheric resistance to the suction stroke of the piston 2 will be compensated for by the atmospheric pressure on the return stroke. Hence, there is practically no loss of power through operation of the piston 2 during the period when the valve 12 is held closed by the air pressure through pipe 16 on the piston 14.

The burner shell 32 is constructed in two halves $d$, $e$, each of which is provided with a channel $f$ into which is fitted the inlet pipe $g$ of the vortex chamber at the side of the burner shell opposite that through which the flame port 30 opens, so that the passage from the ports 34 and 74 to the port 33 is unobstructed by the pipe $f$. The passage through said pipe is a slot-like orifice and said pipe is correspondingly flattened to admit a large volume of air through a small angular opening of the valve 27.

By this construction the vortex chamber 29 is easily secured in place by the screw 30 screwed into the top of the vortex chamber and into the assembled halves $d$, $e$ of the burner shell. The burner shell is a rectangular body contained in a seat $h$ in the cylinder head $i$ which is flanged onto walls of the cylinder $c$ and secured by the seat bolts $j$.

A form of engine constructed to take full advantage of the principles of this discovery and invention is shown in Figs. 10 and 11 which will now be described.

The principles of the broad idea of means embodied in the simpler form of engine shown in Figs. 1–9 are all exemplified in the reversible variable cut-off engine illustrated in Figs. 10 and 11. In Fig. 10 certain parts that correspond to parts shown in Figs. 1–9 are designated by reference characters which are applied to such parts in Figs. 1–9.

For the purpose of regulating the supply of compressed air, the air pressure pipe 16' is connected to the unloading cylinder 81 and operates to vary the opening of intake valve 82 and the port 83. The intake air valve 82 controlling the intake port 83 and operated through the integral arm 84 has its movement controlled by the action of the unloading cylinder 81 which is fitted with a piston 85 that receives air from the relief valve 22 through the air pipe 16' and thus operates to move the piston 85 against the pressure spring 86 to move the rod 87 which engages the bell crank 88 mounted on the unloading rock shaft 89 which is supported by the bearing 90 integral with the cylinder shell $c$ thus to move the rod 91, and through the medium of the pin 92 to shift the intake valve rod 93, so as to move the block 94 in the slot 84' and thus vary the length of the leverage to operate the lever 84 and thereby vary the amount of opening of the valve 82, or, if desired, to entirely prevent its opening by shortening the angular movement of said valve, limiting the pressure of the compressed air and thus determine the working constant pressure for the working cylinder subject to throttle control.

All the valves of this engine are operated by means of the eccentric 58' adjustably mounted to slide upon the flange 96 in the guides 97 so that said eccentric may be shifted across the lay shaft 98 from a position representing the forward movement of the engine to one representing the backward movement of the engine. This movement is accomplished by a well-known reversing means in which the rod 99 by operation of the lever 100 engaging the collar 101 may be thrust in or out of the bore 102; said rod 99 having oblique teeth 103 formed on a plane with its axis engaging similar teeth 104 on the key 105, key 105 being mounted on opposite ends of the slot 106 in the eccentric. By moving rod 99 in and out of the bore 102 the eccentric is moved from one side to the other of the lay shaft. Fractional movements of the eccentric from either extreme position will vary the amplitude of movement of all of the valves. The eccentric 58' is connected by means of the eccentric rod 107 and arm 60' to the admission valve 27. Said admission valve is also provided with arm 108 for the operation of the intake valve 82 through the medium of the valve rod 93. The exhaust controlling rod 109 is connected by pin 110 to the rock-shaft arm 111 and operates to move the rock-shaft 112 and thereby the exhaust arm 113, which through the adjusting screw 114 engages the exhaust valve stem 115. Said exhaust valve is closed through the medium of the spring 116, engaging the spring cap 117, said closure being resisted by means of the exhaust controlling dash pot piston 118 operating in the cylinder 119 which is provided with the vent 120, the outer end of the dash pot cylinder being closed by means of the screw plug 121 which acts as a guide for the valve stem 115. The exhaust valve spring 116 is made sufficiently stiff to cause the valve 76" to close slowly against the resistance of the dash pot action of the piston 118 in the cylinder 119, thus causing this valve to remain open during the whole of the exhaust stroke. Final closure of the exhaust valve at the end of the power piston exhaust stroke is accomplished through the medium of pin 122 under tension of spring 123 that engages the collar 124 on pin 122. Said pin operates in the guides 126 and 125 which are integral with the power piston 1. Leakage past the pin 122 is prevented by the stuffing box 127.

This arrangement of a weak spring on the valve, a second spring 123 mounted in the piston, provides means for insuring the closure of the exhaust valve at all times upon the beginning of the power stroke.

The shifting eccentric 58' provides means for varying the cutoff of all the valves on the admission stroke and thereby varying the output of power of the engine to meet the demands of the load, and at the same time controlling the amount of air compressed. This movement, while closing the intake admission valves earlier, would also close the exhaust valve early, therefore the proportions of the rocker arm 111 and the exhaust arm 113 are so developed that the time of opening the exhaust valve 76" is properly timed relative to the position of power piston 1; and because the spring 116 will close this valve slowly against the dash pot piston 118, the exhaust cutoff valve 76" will remain open until the pin 122 closes it irrespective of the position of the eccentric 95.

The action of the unloading cylinder 81 through the rod and bell cranks, changes the position of the block 94 in the slot 84' of valve arm 84, operates to shorten or entirely prevent the opening of valve 82 whenever the pressure in the receiver 21 reaches a predetermined amount for which the relief valve 22 is set thus further limiting the amount of compressed air. In order to insure a sufficient supply at all times, the compressed air ordinarily produced by the air compressor as controlled by the variable cutoff provided for by the shifting eccentric is in excess of that actually required. The above described unloading limits this excess.

In Fig. 10 the engine is shown in position for starting with stored compressed air in receiver 21 and its connections, the valve 27 being shown partly open. The insulating block 130 provided with the contact segment 131 is mounted upon ignition shifting lever arm 132 and is rotatable by hand about the axis of the block 130 through 90° so as to control and to reverse the action of the spark at spark plug 75, which, from the nature of the view is cut away, but is indicated in the diagram. The position of the block 130 is that for normal running; under which condition the spark is started just before valve 27 opens, and continues for a short period of the stroke of power piston 1. The contact breaks after piston 1 has traveled a very short distance downward from that shown. In the view the contact is just about to break and the valve is opened about one-third of the way.

A contact lever arm is provided on the valve 27 with a yielding tip 133 for engaging the contact segment 131. Contact is made and the spark is started at spark plug 75 in the cylinder just before the beginning of the power stroke, thus insuring ignition upon the first admission of fuel and compressed air to the engine under normal starting conditions when there is pressure in receiver 21 for starting the engine.

To start cold without any compressed air in receiver 21, the lever arm 132 must be moved clockwise through 90°, from the position shown. With the segment so placed the engine may be turned over by hand and the carbureting chamber will act as an ordinary gas engine carbureter. A mixture of fuel and air will be drawn by suction into the cylinder on the advance of the piston, and with this segment in this position, the spark will be produced just as the valve 27 closes, giving an explosive impulse with the cylinder about half full of mixture at about atmospheric pressure, thus starting the engine. The compressor begins to act immediately and the pressure accumulates in 21. After fifteen or twenty revolutions of the engine, the lever arm 132 may be returned to the position shown on the drawing, whereafter the action will be normal under the constant pressure cycle. The construction shown in Figs. 10 and 11 provides, therefore, a reversible variable cut-off engine of the constant pressure type, making possible the highest economy that can be obtained with such an engine, because admission of the fuel may be controlled to just that amount to take care of the work demanded and the air compressed is only that absolutely necessary to carry on such work.

In starting either form of the engine from rest cold, the engine may be revolved by any suitable starting means with the throttle 24 closed until a small amount of air pressure is accumulated in air receiver 21. Then place the engine crank shaft in approximately the position shown in the drawings, which will cause admission valve 27 to assume a slightly open position. Then upon opening the throttle 24 the engine will start by said air pressure alone. The air will flow through the opening of valve 27 into the vortex carbureting and combustion chamber 29 and through the axial outlets 34, spherical chamber 31 and through the flame port 33 to the power cylinder 3. The placing of the engine crank and piston in the position shown also causes, through the action of the cam 61 on the end of valve 27, a movement of the lever 62 which causes an engagement with the head 68 of the fuel timing valve 51 and causes said valve to open as shown in Fig. 7. Upon opening the throttle as above described, compressed air flows not only through valve 27, but also through the pressure equalizing pipe 37 to the air chamber 38 above the fuel cup 39, thus placing on the surface of the fuel an air pressure the same as that which is flowing into the vortex carbureting and combustion chamber through valve 27. As the piston advances, air flowing in and following the piston, causes a drop of air pressure in the air current at the center of the vortex. Said drop of pressure in this flowing air is applied to the jet outlet 36 of the fuel nozzle 35, hence through the medium of the fuel duct 50 to the fuel orifice $b$ causing fuel thereby to be forced through the fuel duct 50 and fuel nozzle 35, issuing at the outlets 36 in the center of the whirling mass of air.

The proportion of said flowing fuel to the air entering the combustion chamber may be adjusted by means of the needle valve 52 which allows air to flow through the air port $a$, and to thus reduce the difference of pressure between the fuel chamber 38 and the outlet 36 as well as to produce a current of air through the duct 50 which will tend to accelerate the flow of the fuel and assist in breaking up the fuel as it issues as an atomized spray, with this air through the jet outlet 36. The mixture of air and fuel flowing in duct 50 to nozzle 35 is so rich in fuel it will not fire back from the jets 36. The spark plug 75 is so placed that the spark is near the axis of the rotating mass of fuel and air, and is so connected that a spark occurs just before the beginning of the piston's downward stroke which is just before the beginning of the opening of valve 27 and valve 51, and endures for a space of time insuring ignition of the fuel immediately upon entering the combustion chamber 29 before sufficient mixture is accumulated to cause explosive action. The engine will then operate the piston moving on its power stroke until the valve 27 is again closed automatically through the medium of the eccentric 58, the rod 59 and the pin 60. Closing the valve 27 also simultaneously closes the valve 51; thence the supply of air and fuel ceases, and the hot products of combustion then contained within the working cylinder 3 continue to expand at gradually lowering pressure until the end of the working stroke is reached, when the exhaust valve 76 is opened by cam 77 and remains open throughout the whole return or exhaust stroke. Then these operations repeat themselves; admission valve 27 opening exactly on center, fuel valve 51 opening simultaneously therewith, or nearly so, and ignition occurring at the same instant. A steady combustion results during the advance of the piston until the valve 27 is again closed.

The pressure upon the piston will be approximately equal to that of the air receiver. The volume of the gases which develops the power stroke will be the result of the combustion of the fuel and will be from five to ten times, more or less, the volume of the air entering the vortex chamber.

After a few minutes time the nozzle 35 and carbureting combustion chamber 29 with its enveloping shell 32 become heated, thus vaporizing fuel remaining in nozzle 35, which burns with a small flame that continues after the closing of 27 and 51 throughout the expansion stroke and throughout the exhaust stroke, and this furnishes a means of igniting the fuel mixture at each successive admission of fuel and air thus insuring instantaneous ignition without explosion under ordinary operating conditions with the spark shut off.

This is accomplished and insured by means of the small vent 72 in fuel valve 51. Said vent 72 is drilled into the end of, and extends a distance along the axis of valve 51 and thence radially to the clearance space 73 between the valve and the bore within which the valve works and thus provides a very small leak of air, which, when this valve is closed will continually flow through the port *a* down the fuel duct 50 along the thin annular crack of the clearance space 73, and thence through duct 72 and nozzle 35 to issue at the outlet 36. When valve 51 shuts off at the end of each admission period there will be suspended a small amount of fuel in duct 50 and in the nozzle 35. This air in vent 72 will utilize that fuel for sustaining said small flame at outlet 36 which insures ignition without the spark.

Compressed air for continuous operation is maintained in the receiver 21 by the action of the annular compressor cylinder 4 formed by enlargement 2 of the power piston 1.

During the advance of the piston, intake valve 12 opens to allow air to flow into chamber 4. On the return stroke, valve 12 is closed by spring 13 and the air contained in chamber 4 is compressed and forced into the receiver 21 through the check valve 20. When the pressure in 21 reaches a pre-determined amount, relief valve 22 will open and air will flow through pipe 16 to the underside of piston 14 in cylinder 15 and close valve 12; relief valve 22 seating again as soon as the pressure in pipe 16 and cylinder 15 equal the pressure from receiver 21 as delivered through the relief valve 22.

Unloading piston 14 has a sliding fit in cylinder 15 so that the air acting on piston 14 escapes after a short period through the clearance of said piston and through vent *k* and allows the valve 12 to act normally again. During this period of closure of valve 12 no air is compressed and thus the air pressure in 21 falls slightly due to engine consumption, and is again raised as valve 12 opens to again admit air. This air pressure in receiver 21 and its connections is maintained within certain limits.

The area of piston 3 is about one half the area of piston 1 and determines the capacity of the engine. The valve 51 is normally held closed by the spring 69 and its opening with reference to the time of opening of valve 27 is determined by oscillating the pin 64 forming the fulcrum of the lever 62. This is done by moving hand lever 67. Such movement will cause the lever 62 to engage the head 68 of the valve 51 earlier or later as may be desired and thus adjust the time of opening of valve 51 earlier or later than valve 27. When full power and speed of the engine is desired, the fuel delivery to the combustion chamber must be timed to accurately meet the air delivery; and as the fuel is more viscous than air, and hence slower of movement, the opening of the fuel valve must anticipate the opening of the valve 27 and the fuel must be started ahead of the opening of valve 27. Through air equalizing pipe 37 the air pressure on fuel 39 equals that of the air flowing to the tangential opening of the vortex combustion chamber 29. Therefore, if hand lever 67 is so placed that valve 51 opens ahead of valve 27 at the beginning of the power stroke when the exhaust valve has just closed, and the pressure in chamber 29 and cylinder 3 is nearly atmospheric, the pressure of the air on fuel 39 will force the starting of the fuel to occur ahead of the starting of the air through the valve 27.

The pressure on fuel cup 39 is determined by the pressure in the air receiver and the air supply pipe 23 and remains practically constant. Upon the opening of valve 27 a small fraction of a second after the opening of valve 51, the combustion chamber 29, spherical chamber 31, and the working cylinder 3, will fill with air under pressure equal to that of the fuel cup 39, except that the velocity of the air filling this general space in the process of flowing in and maintaining the supply with the advance of the piston, will cause by vortical action a drop of pressure to instantly occur at the outlets 36; in consequence of which the fuel will continue to flow through fuel duct 50 and nozzle 35 to the combustion chamber 29 in exact proportion to the amount of air entering through the air valve 27 during the admission period of the power stroke.

This action of the vortex for proportioning fuel to air is fully set forth in my Letters-Patent Nos. 1064627 and 1064628, issued June 10, 1913 and No. 1223159 issued April 17, 1917.

The operation of the reversible variable cut-off engine appearing in Figs. 10 and 11 will be understood from the foregoing description thereof.

In practical operation it may be assumed that the products of combustion flowing from the low pressure zone through the tortuous passage formed by ports 34 and annular spheroidal space at 31 and issuing through the flame port 33 may be incandescent, and that the heat of combustion in the combustion chamber may reach its maximum at the tip of a flame extending into the cylinder through port 33. The period of this maximum temperature will depend upon the time of admission of the fuel and air.

The vortical action resulting from the peculiar construction and arrangement of the carbureting element 29 in the combustion chamber causes a definite localization of the combustion and prevents the flame cap at port 33 from becoming unduly extended into the cylinder.

The operation of the valve mechanism therefore causes the combustion chamber to intermittently supply the cylinder with expanded gases and vapors of combustion at a pressure which will equal that of the air supplied.

The heat of combustion within the combustion chamber may, for instance, rise to 6000° or more, Fahrenheit, thus indicating an increase in volume of the inflowing air to about eleven times, more or less, of the volume of such air at the air supply temperature without accounting for such increase as may arise from the production of the gases and vapors produced by the combustion of the hydrogen and carbon of the fuel.

It is anticipated that this engine may economically use alcohol and crude oil as well as the distillates of petroleum.

It may be assumed that at certain angular positions of the revolving crank, the velocity of the air flowing in the passage 28 to the vortex mixing chamber behind the moving piston, may be as high as 200 feet per second, producing thereby a vortex drop of pressure amounting to approximately thirty-six inches of water column. Assuming a fuel having the same specific gravity as water, the corresponding velocity of fuel would be approximately fourteen feet per second. It may therefore be assumed that unless the fuel valve 51 is opened in advance of the air valve 27 a proper junction of fuel and air cannot occur at the beginning of the power stroke, therefore particular attention is directed to this feature in the construction of the engine.

I claim:—

1. The method of producing power from fuel which consists in supplying separately and simultaneously to a confined space, compressed air and fuel at the same pressure, establishing a vortex in the admitted air current and utilizing the pressure drop of such vortex to establish and meter the fuel flow, combining and combusting the same in said space, and applying the product to the purpose set forth.

2. The method of producing power from fuel which consists in supplying separately and simultaneously to admission points of a confined space, compressed air and fuel both under the same pressure, establishing a vortex in the admitted air current and utilizing the pressure drop of such vortex to establish and meter the fuel flow, combining and combusting the same in said space and applying the product to the purpose set forth.

3. The method of producing power from fuel which consists in supplying separately and simultaneously to admission points of a confined space, compressed air and fuel both under the same pressure, establishing a vortex in the admitted air current and utilizing the pressure drop of such vortex to establish and meter the fuel flow, combining and combusting the same in said space during the period of introduction and applying the product to the purpose set forth.

4. The method of producing power from fuel which consists in producing by timed impulses, a cyclonic combustion zone within an engine cylinder and by supplying air to the periphery, and fuel to the axis of such zone; conducting the resultant products centrally from said zone and applying such products directly to a piston to operate the same.

5. The method of producing power from fuel which consists in producing by timed impulses, a cyclonic combustion zone within an engine cylinder, and maintaining the same by supplying air peripherally thereto, introducing fuel at the axis of such zone; maintaining combustion in such zone; conducting the resultant products centrally from said zone in opposite directions, and applying such product directly to a piston to operate the same.

6. The method of producing power from fuel which consists in producing by timed impulses a cyclonic combustion zone and maintaining the same by supplying air peripherally thereto; supplying fuel at the axis of such zone; maintaining combustion in such zone and conducting currents of the resultant product centrally from said zone in opposite directions; uniting the currents and applying the product as a unit directly to a piston to operate the same.

7. The method of producing power from fuel which consists in producing a spheroidical cyclonic combustion zone and maintaining the same by supplying air peripherally thereto; supplying fuel centrally of said zone; maintaining combustion in such zone, conducting products of combustion axially from both ends of said zone, and thence around said zone, thus localizing the combustion zone and equalizing the temperature thereof.

8. The method of producing power from fuel which consists in producing a spheroidical cyclonic combustion zone and maintaining the same by supplying air peripherally thereto; introducing fuel centrally of said zone maintaining combustion in such zone; conducting products of combustion axially from both ends of said zone, and thence around said zone to utilize the internal heat of the zone to localize combustion and applying the resultant product to the purpose set forth.

9. The method of producing power from fuel which consists in producing a cyclonic combustion zone and maintaining the same by supplying air peripherally to and supplying fuel centrally of said zone; maintaining combustion in such zone conducting products of combustion axially from said zone in oppositely directed currents and thence around said zone; uniting said currents and directing the resultant products to produce linear motion outside the zone.

10. The method of producing power from liquid fuel which comprises supplying working charges of air behind a piston at a pressure predetermined to drive said piston; combusting fuel behind the piston to increase the volume of expansible medium at the predetermined pressure to operate said piston; and producing behind the combustion zone a mixture of air and fuel that is rich in fuel to prevent back firing.

11. The method of producing power from liquid fuel which comprises supplying working charges of air behind a piston at a pressure predetermined to drive said piston; combusting fuel with said air behind the piston to increase the volume of expansible medium at the predetermined pressure to operate said piston; delivering behind the combustion zone a mixture of air and fuel that is rich in fuel to prevent back firing; and timing the admission of the rich fuel mixture to form an igniting junction of the same with said working charges of air.

12. The method of producing power from liquid fuel which comprises supplying working charges of air behind a piston at a pressure predetermined to drive said piston; combusting fuel behind the piston to increase the volume of expansible medium at a predetermined pressure to operate said piston; producing behind the combustion zone a mixture of air and fuel that is rich in fuel to prevent back firing; and continuously supplying to the combustion zone a small amount of said fuel supply and also a small supply of air to maintain a pilot flame for ignition of the working charges of fuel and air.

13. The method of producing power from liquid fuel which comprises supplying working charges of air behind a piston at a pressure predetermined to drive said piston; combusting fuel with said air behind the piston to increase the volume of expansible medium at the predetermined pressure to operate said piston; producing behind the combustion zone a mixture of air and fuel that is rich in fuel to prevent back firing; timing the admission of the rich fuel mixture to form an igniting junction of the same with said working charges of air; and continuously supplying to the combustion zone a small amount of said fuel supply and also a small supply of air to maintain a pilot flame for ignition of the working charges of fuel and air.

14. The method set forth of producing power from fuel which consists in producing a vortical combustion zone maintaining combustion therein, enveloping such zone equatorially with whirling air, surrounding the air envelope with partly burned products from the combustion zone and supplying air to the products thus surrounding the air envelope, for the purpose of completing combustion.

15. The method set forth of producing power from fuel which consists in producing a vortical combustion zone maintaining combustion therein, enveloping such zone equatorially with whirling air, surrounding the air envelope with partly burned products from the combustion zone and supplying air to the products thus surrounding the air envelope, for the purpose of completing combustion; and then giving linear direction to the resulting products to drive a piston.

16. The method of producing power from fuel which consists in maintaining a pilot light, intermittently supplying fuel and air separately and simultaneously adjacent said pilot light to surround the same with a combustible mixture under a predetermined pressure, thus to produce intermittent periods of combustion to increase the volume of the air and to ignite the intermittent charges of mixture as they occur.

17. The method of supplying fuel for the production of power which consists in compressing air by determined air compressor means to a predetermined pressure; applying such air pressure to operate the compressing means; applying said air pressure to a supply of fuel and thereby introducing fuel into the air which is applied to operate said air compressing means under such air pressure and there forming a mixture; combusting said mixture, and thereby producing heat and applying the same to increase the volume of the working gases and applying the working gases, thus increased in volume to operate the compressing means.

18. The combination with a piston and a cylinder, of means to form a confined space directly communicating with the piston displacement in the cylinder; means to supply compressed air to said space at a predetermined pressure to drive the piston; means to supply fuel to said space separately from said air and simultaneously therewith at the same pressure; means to cause a pressure drop of the admitted air to cause fuel flow in measured relation to said air, means to combine the fuel and air in said space and means to ignite the mixture of fuel and air in said space.

19. The combination with a cylinder, of a piston working therein; a combustion chamber opening freely into said cylinder; a vortex chamber opening axially into said combustion chamber; means to supply fuel to the center of said vortex chamber; means to supply air under pressure tangentially to the vortex chamber; and means to ignite the mixture of fuel and air in the vortex chamber.

20. An engine comprising a cylinder; a piston inside the cylinder; a combustion chamber directly open to said cylinder and piston; means for supplying compressed air tangentially to the combustion chamber to produce a vortex; means to supply fuel directly to the center of the vortex; and means to ignite the fuel.

21. An engine comprising a cylinder, a piston inside the cylinder, a combustion chamber communicating with said cylinder; means for supplying compressed air tangentially to the combustion chamber to produce a vortex; means to supply fuel to the center of the vortex; means to ignite the fuel; and means to apply to the fuel a pressure corresponding to that of the compressed air, for the purpose of regulating the flow of fuel.

22. An engine comprising a cylinder; a piston inside the cylinder; a combustion chamber communicating with said cylinder; means for supplying compressed air tangentially to the combustion chamber to produce a vortex; means to supply fuel to the center of the vortex; means to ignite the fuel; means to apply to the fuel a pressure corresponding to that of the compressed air, for the purpose of regulating the flow of fuel; and means to control the flow of the compressed air.

23. An engine comprising a cylinder; a piston inside the cylinder; a combustion chamber communicating with said cylinder; means for supplying compressed air tangentially to the combustion chamber to produce a vortex; means to supply fuel to the center of the vortex; means to ignite the fuel; means to apply to the fuel a pressure corresponding to that of the compressed air for the purpose of regulating the flow of fuel; means to control the flow of the compressed air; and means to time the admission of fuel relative to that of the air.

24. An engine comprising a cylinder; a piston inside the cylinder; a combustion chamber communicating with said cylinder; means for supplying compressed air tangentially to the combustion chamber to produce a vortex; means to supply fuel to the center of the vortex; electrical means to ignite the fuel; means to apply to the fuel a pressure corresponding to that of the compressed air for the purpose of regulating the flow of fuel; means to control the flow of the compressed air; and means to time the admission of fuel relative to that of the air.

25. An engine comprising a cylinder; a piston inside the cylinder; a combustion chamber communicating with said cylinder; means for supplying compressed air tangentially to the combustion chamber to produce a vortex; means to supply fuel to the center of the vortex; means to ignite the fuel; means to supply a combustible mixture centrally of the vortex to maintain a pilot flame between admission periods of the tangential air supply; means to apply to the fuel a pressure corresponding to that of the compressed air for the purpose of regulating the flow of fuel; means to control the flow of the compressed air; and means to time the admission of fuel relative to that of the air.

26. An engine comprising a cylinder, a piston inside the cylinder; a combustion chamber communicating with said cylinder; means for supplying compressed air tangentially to the combustion chamber to produce a vortex, means to supply fuel to the center of the vortex; electrical means to ignite the fuel; means to supply a combustible mixture centrally of the vortex to maintain a pilot flame between admission periods of the tangential air supply; means to apply to the fuel a pressure corresponding to that of the compressed air for the purpose of regulating the flow of fuel; means for adjusting the relation between the fuel and the air; means to control the flow of the compressed air; and means to time the admission of fuel relative to that of the air.

27. An engine comprising a cylinder, a piston inside the cylinder; a combustion chamber communicating with said cylinder; means for supplying compressed air tangentially to the combustion chamber to produce a vortex; means to supply fuel to the center of the vortex; means to ignite the fuel; means to apply to the fuel a pressure corresponding to that of the compressed air for the purpose of regulating the inflow of fuel; means to control the period of flow of the compressed air; means to time the admission of fuel relative to that of the air; and means for applying said air pressure to the fuel to initiate the introduction of the fuel ahead of said tangentially supplied air.

28. An engine comprising a cylinder, a piston inside the cylinder, a combustion chamber communicating with said cylinder; means for supplying compressed air tangentially to the combustion chamber to produce a vortex; means to supply fuel to the center of the vortex; means to ignite the fuel; means to apply to the fuel a pressure corresponding to that of the compressed air for the purpose of regulating the inflow of fuel; means to control the period of flow of the compressed air; means to time the admission of fuel relative to that of the air; and means for applying said pressure to the fuel to cause simultaneous junction of fuel and air at the center of the vortex, irrespective of the relative viscosity of the fuel and air.

29. The combination of a cylinder; a combustion chamber having an inlet and communicating with the cylinder; a piston in said cylinder; a valve for said inlet; a carbureter provided within said combustion chamber with means adapted to provide a low pressure area within said combustion chamber near said inlet; means to supply compressed air to the carbureter under control of said valve; a fuel inlet to said low pressure area; a valve controlling the fuel inlet; means to open and close the fuel valve co-ordinately with the inlet valve; and means to ignite the fuel within said low pressure area.

30. An engine comprising a cylinder; a piston in said cylinder; a combustion chamber freely open to the cylinder; means for supplying compressed air to said combustion chamber; means for directing the compressed air within said combustion chamber to produce vortical action, and thereby to provide a low pressure area within the burner; means to supply fuel to the low pressure area, and means to ignite the fuel.

31. An engine comprising a cylinder; a piston in said cylinder; a combustion chamber freely open to said cylinder; means for supplying compressed air to said combustion chamber; means for directing the compressed air within said combustion chamber to produce vortical action, and thereby to provide a low pressure area within the burner; means to supply fuel to the low pressure area; and means to ignite the fuel; the outlet from said low pressure area to the cylinder being tortuous so as to force localization of agitation and mixing of the fuel and air.

32. A constant pressure internal combustion engine provided with a power cylinder, an air compressor cylinder, piston means for said cylinders, a burner arranged to discharge products of combustion into the power cylinder, means to supply air to said burner from the compressor, means to supply fuel to said burner under co-ordinated air pressure, valve means to control admission of compressed air to said burner, valve means to control the admission of fuel to the burner, a valve to control the exhaust from the power cylinder, a valve to control the intake to the air compressor and valve-operating means timed with the piston means to open and close all of said valves in co-ordinated relation to each other.

33. A constant pressure internal combustion engine provided with a power cylinder, an air compressor cylinder, piston means for said cylinders, a burner arranged to discharge products of combustion into the power cylinder, means to supply air to said burner from the compressor, means to supply fuel to said burner under co-ordinated air pressure, valve means to control admission of compressed air to said burner, valve means to control the admission of fuel to the burner, a valve to control the exhaust from the power cylinder, a valve to control the intake to the air compressor, and valve-operating means consisting of a single eccentric timed with the piston means to open, close, reverse and vary the cut-off of all of the admission valves and the opening of said exhaust valve in co-ordinated relation to each other.

34. A constant pressure internal combustion engine provided with a power cylinder, an air compressor cylinder, piston means for said cylinders, a burner arranged to discharge products of combustion into the power cylinder, means to supply air from the compressor to said burner means to supply fuel to said burner under co-ordinated air pressure, valve means to control admission of compressed air to said burner, valve means to control the admission of fuel to the burner, a valve to control the exhaust from the power cylinder, a valve to control the intake to the air compressor, valve operating means timed with the piston means to open and close all of said valves in co-ordinate relation to each other; and means operated by air pressure in excess above a predetermined pressure, to regulate the operation of the intake valve of the air compressor.

35. The means set forth for producing power from the combustion of fuel comprising means for compressing air, means for storing the compressed air, a cyclonic combustion chamber, means for admitting said compressed air to said combustion chamber, a working power chamber directly open to and arranged to receive products from said combustion chamber, a piston in said chamber, means to supply fuel centrally to the combustion chamber under said air pressure, and means for igniting the mixture of fuel and air.

36. Apparatus for producing power from combustion of fuel, consisting of means for compressing air; means for storing the compressed air; a working power chamber; vortex producing means; means for admitting compressed air to the working power chamber through the vortex producing means; means for admitting fuel to the center of said vortex producing means with timed relation to the admission of said compressed air, a constant level chamber; means for maintaining fuel at a constant level in the constant level chamber; means for operably adjusting the proportions of fuel and air; and means connecting said constant level chamber with the fuel-timing means.

37. The method set forth of producing power which consists in establishing an air current of high velocity; applying said air current to liquid fuel; introducing liquid fuel under pressure of said air current to air of said current in co-ordinate proportions determined by such velocity, causing a thorough mixing of the introduced liquid fuel and the air to which it is introduced, causing vortical action of, and immediately igniting the mixture in a vortex chamber and applying the resulting products directly without intervening valves to operate a movable part in an engine cylinder.

38. In the production of power from liquid fuel the method which consists in utilizing vortical action produced by a current of compressed air as a proportioning and mixing means for supplying a burning mixture to produce expansion in a vortex combustion chamber closed to the atmosphere; igniting the mixture within such chamber and applying the resultant products directly to a power chamber without intervening valves.

39. The combination with an engine and a piston cylinder therein, of a carbureting burner open directly to the engine cylinder and without intervening valves; means to automatically and constantly produce a proportioned mixture of fuel and air under pressure during the period of admission of said air and fuel to the burner; and means to cause combustion of said air and fuel in said burner.

40. In the production of power from liquid fuel, the method which consists in utilizing vortical action produced by a current of compressed air as a means of delivering liquid fuel into said current; coordinating the delivery of such fuel with the delivery of said air current, for supplying a burning mixture to produce expansion in a vortex combustion chamber closed to the atmosphere; igniting said mixture and supplying the resultant production directly to the power chamber without intervening valves.

In testimony whereof, I have hereunto set my hand at Los Angeles, California, this 3d day of May, 1917.

O. H. ENSIGN.

Witness:
JAMES R. TOWNSEND.